United States Patent [19]

Crawford et al.

[11] 4,311,230
[45] Jan. 19, 1982

[54] ARTICLE FEEDING MECHANISM

[75] Inventors: Donald C. Crawford; Gary M. Le Taurneau, both of Green Bay, Wis.

[73] Assignee: FMC Corporation, Chicago, Ill.

[21] Appl. No.: 176,942

[22] Filed: Aug. 11, 1980

Related U.S. Application Data

[63] Continuation of Ser. No. 955,671, Oct. 30, 1978, abandoned.

[51] Int. Cl.³ .............................................. B65G 47/52
[52] U.S. Cl. .................................. 198/457; 198/476; 198/811
[58] Field of Search ............... 198/416, 457, 459, 461, 198/476, 597, 811, 817, 836

[56] References Cited

U.S. PATENT DOCUMENTS

| | | | |
|---|---|---|---|
| 3,159,430 | 12/1964 | Kinney | 198/817 |
| 3,166,181 | 1/1965 | Rutkus et al. | 198/457 |
| 3,533,519 | 10/1970 | Anderson | 198/457 |
| 3,900,096 | 8/1975 | Nack et al. | 198/476 |

Primary Examiner—Jeffrey V. Nase
Attorney, Agent, or Firm—Louis J. Pizzanelli; Richard B. Megley

[57] ABSTRACT

Aligned conveyors support and supply a single file of articles to the infeed lug conveyor of a horizontal form, fill and seal wrapping machine. The aligned conveyors are oriented to intersect the infeed conveyor at an angle which can range from 90 to 135 degrees. The chosen angle of intersection is dependent upon article size and geometry. One of the aligned conveyors functions to organize the articles in abutting relation and yet maintains crowding forces or backlog pressure to a minimum. As the leading article of the row of abutting articles arrives at the intersection of the aligned conveyors and the infeed conveyor, it is controllably propelled to the infeed lug conveyor of the wrapping machine.

14 Claims, 23 Drawing Figures

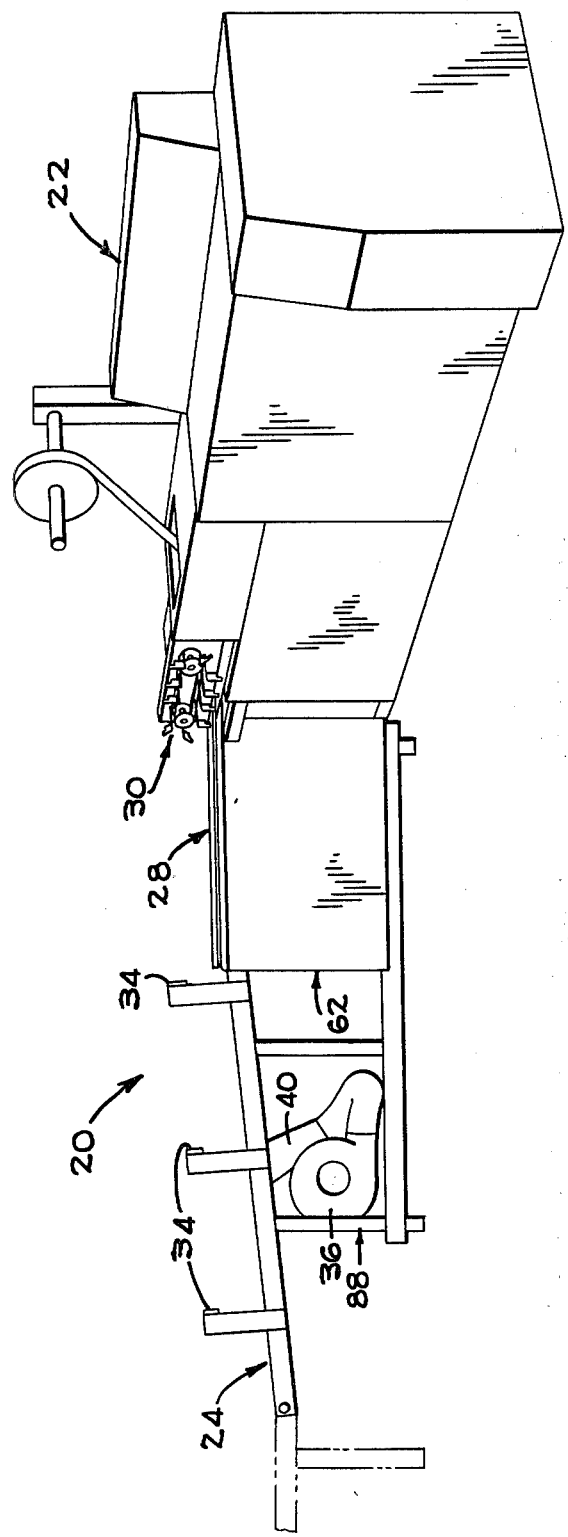

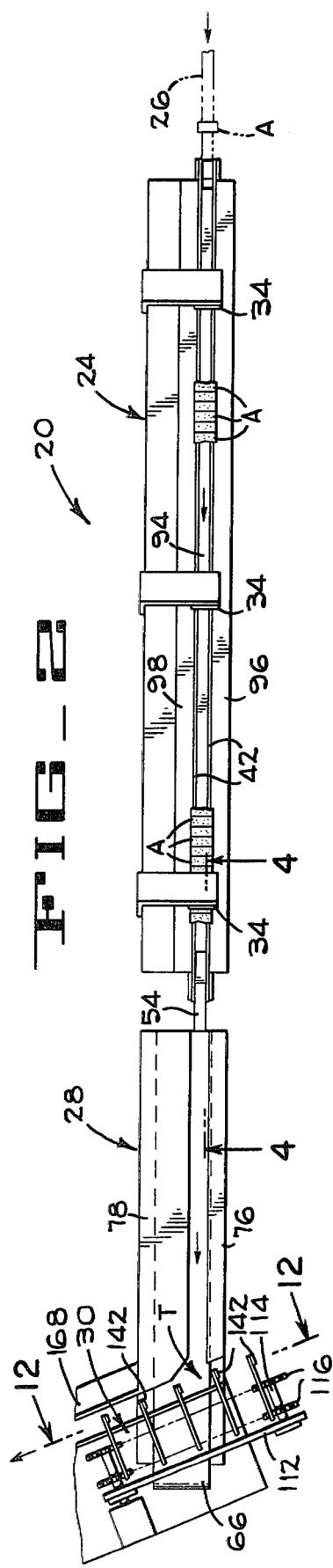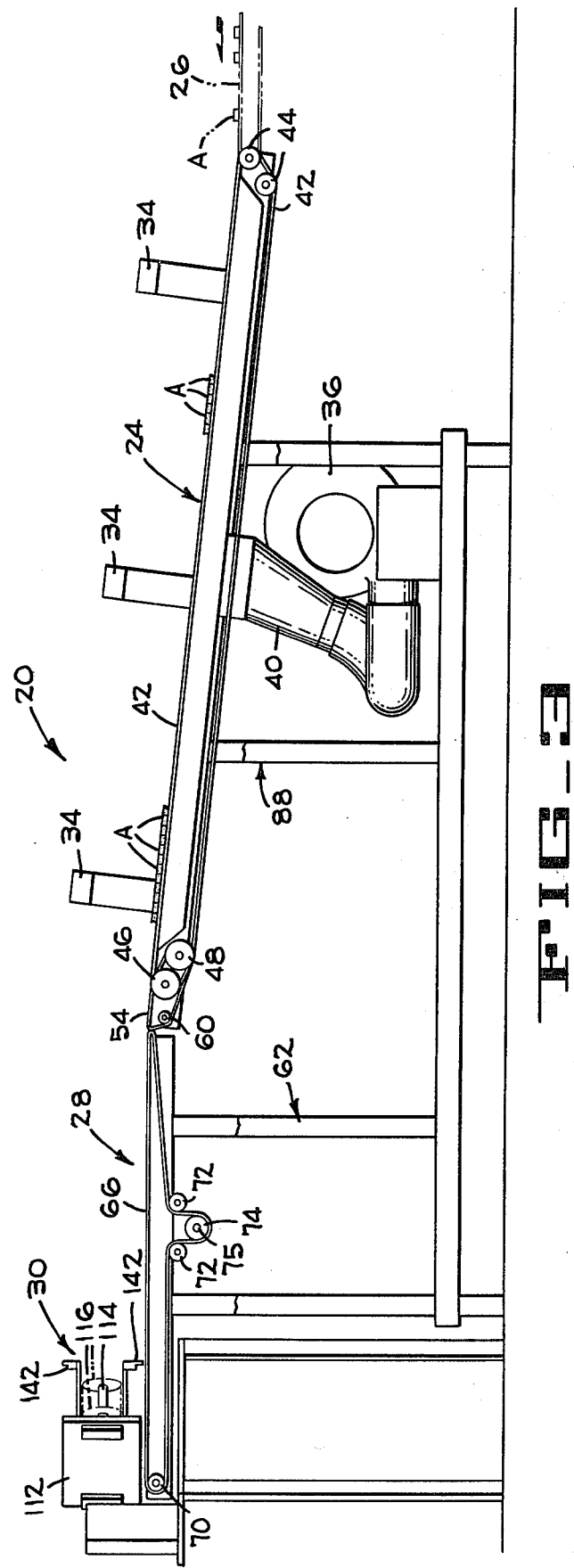

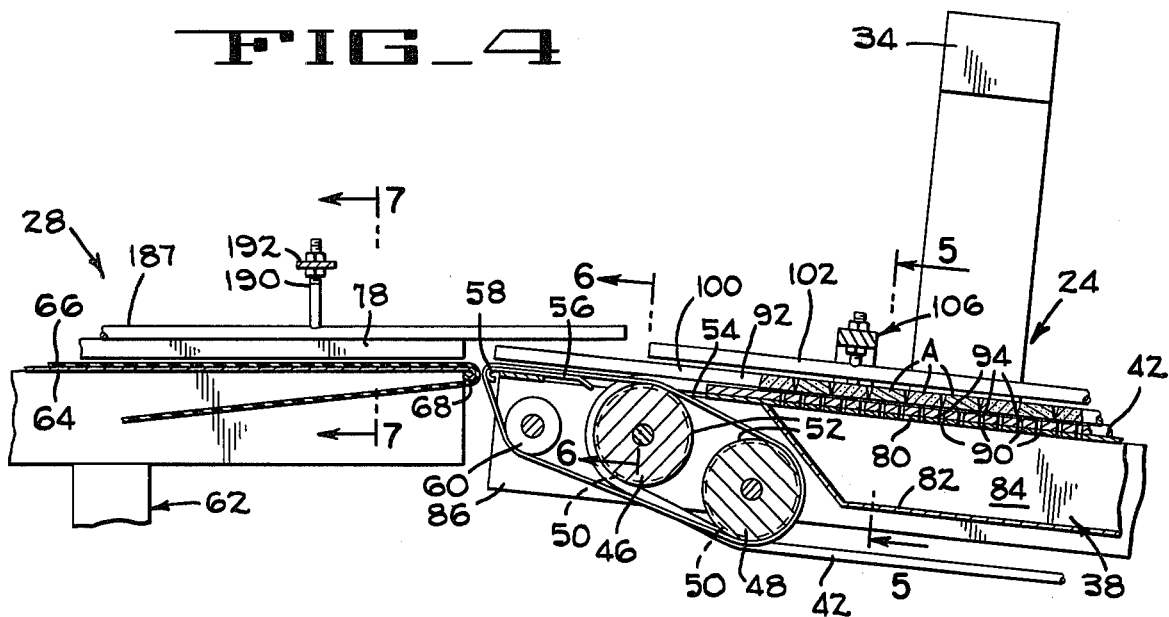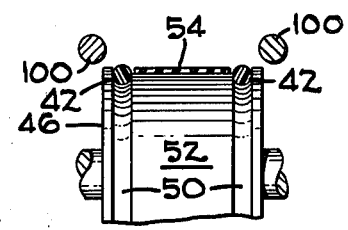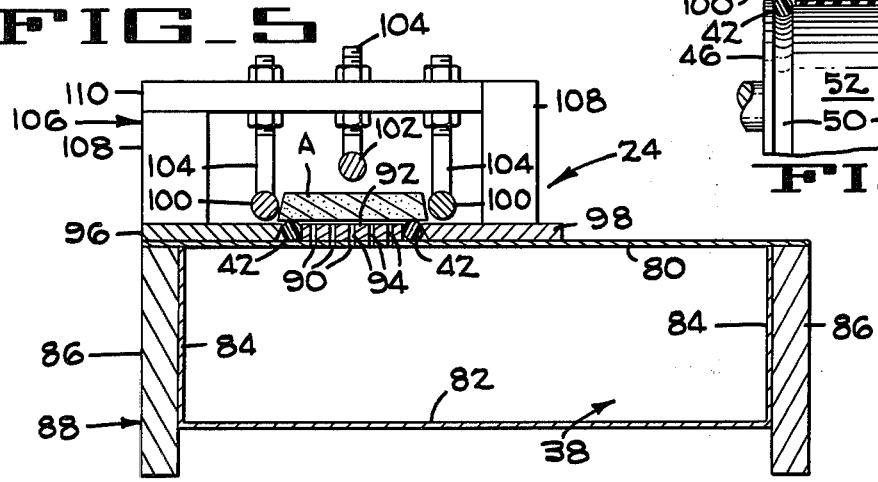

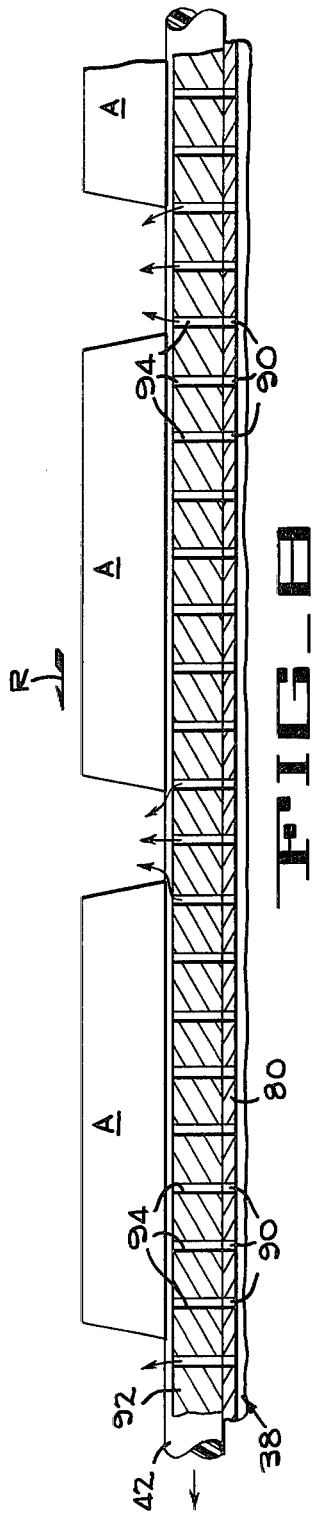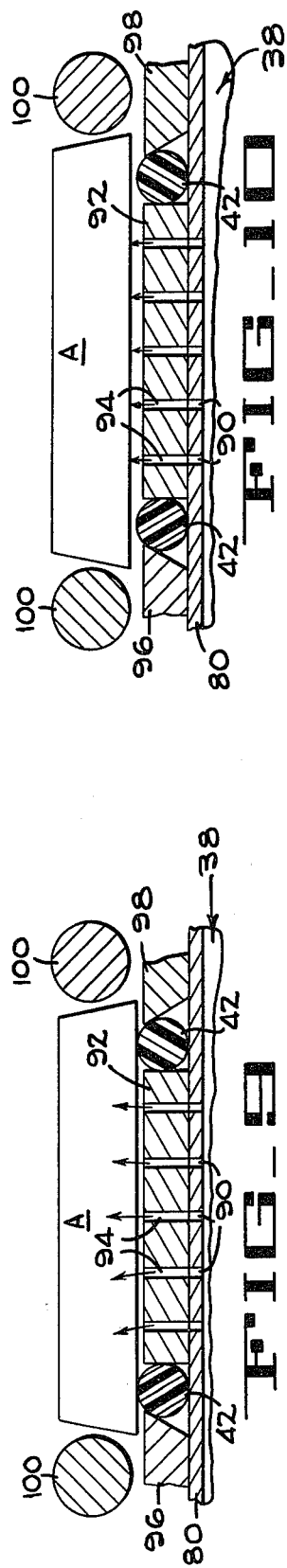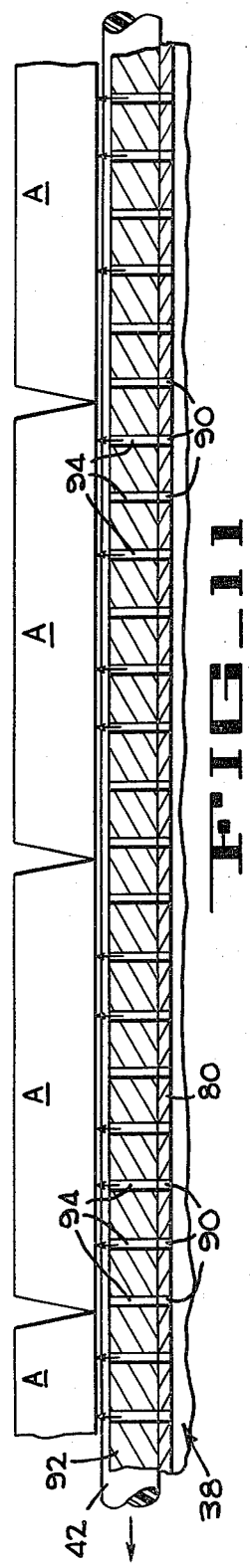

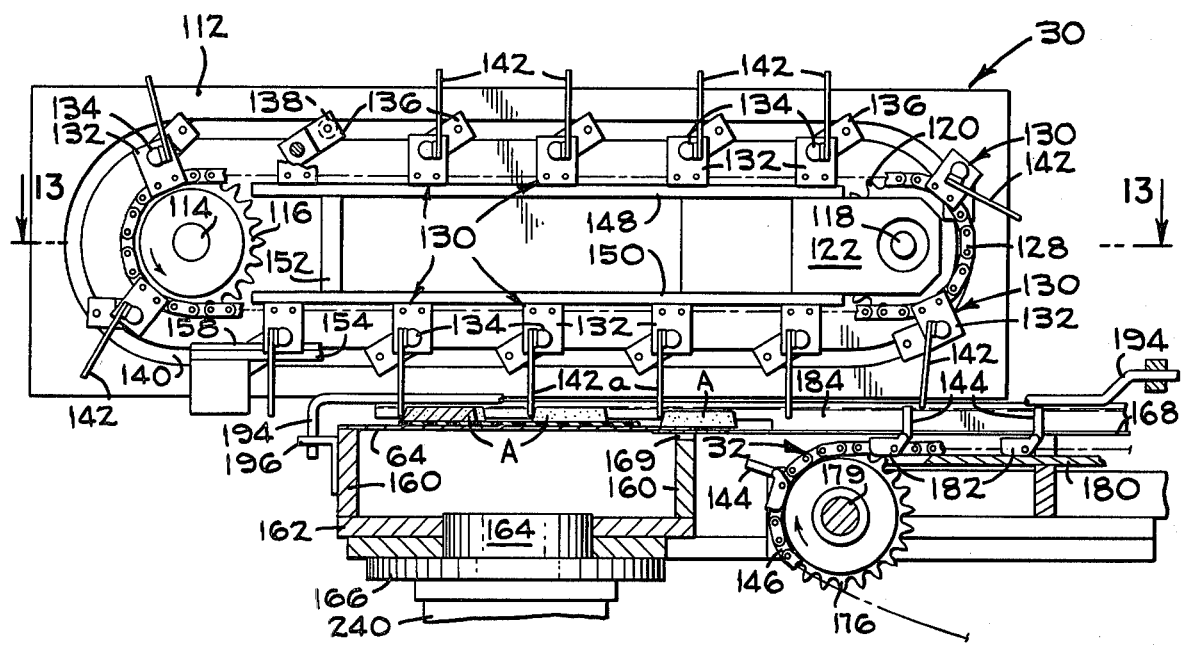
FIG_12
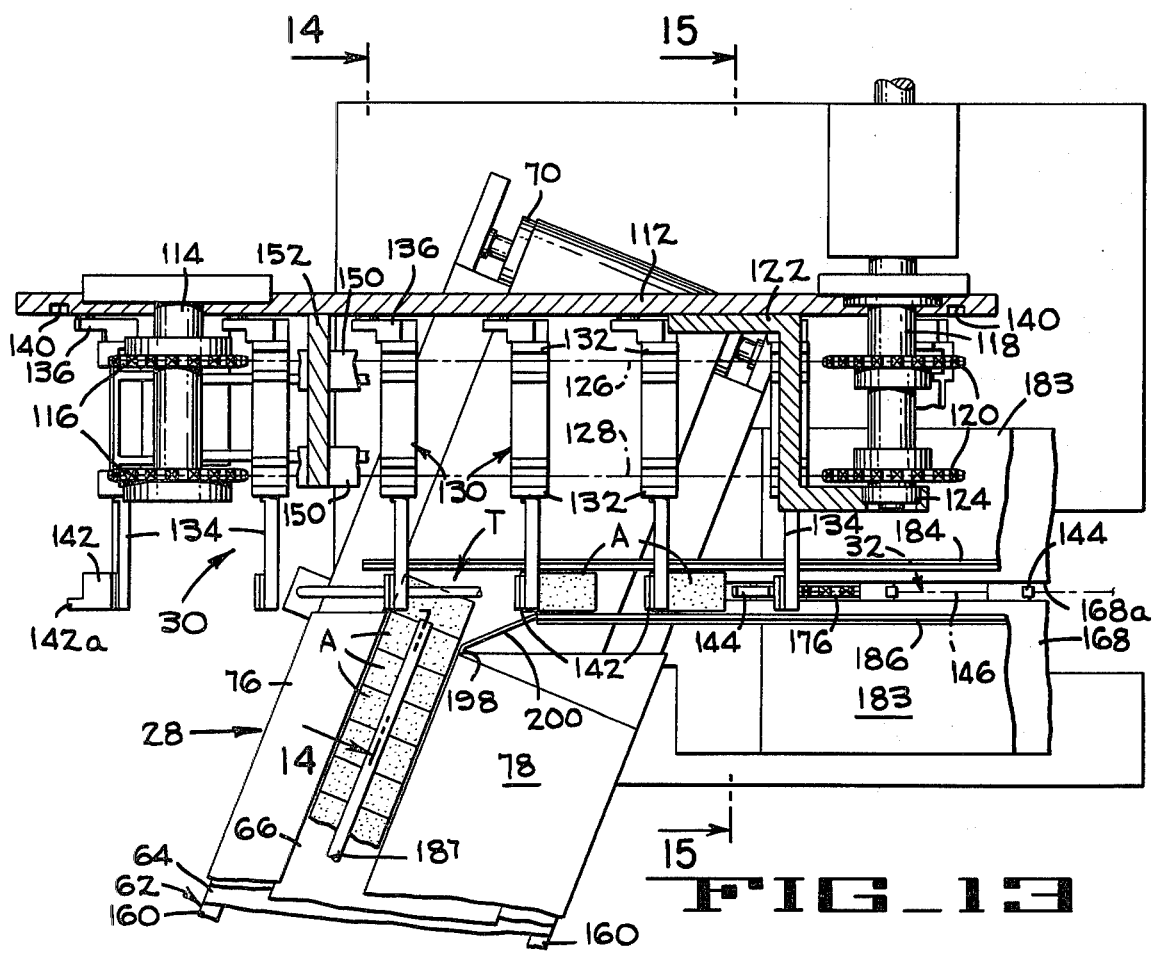
FIG_13

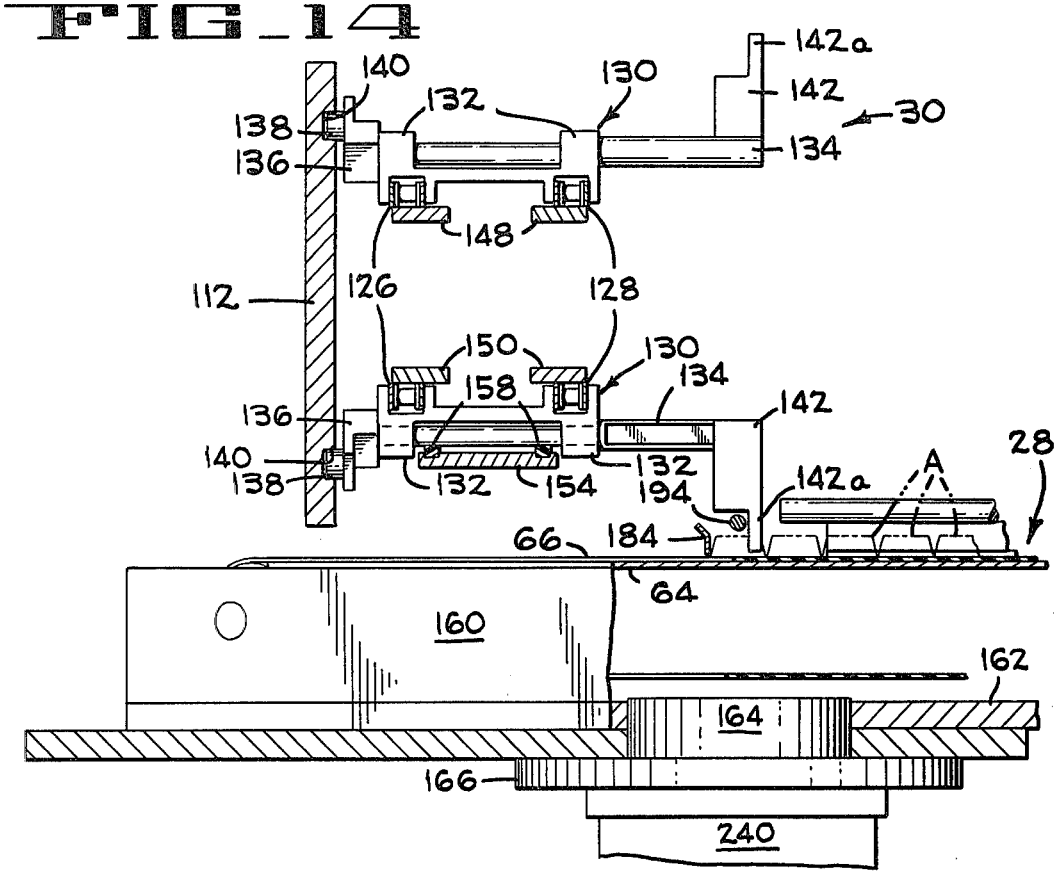
FIG_14
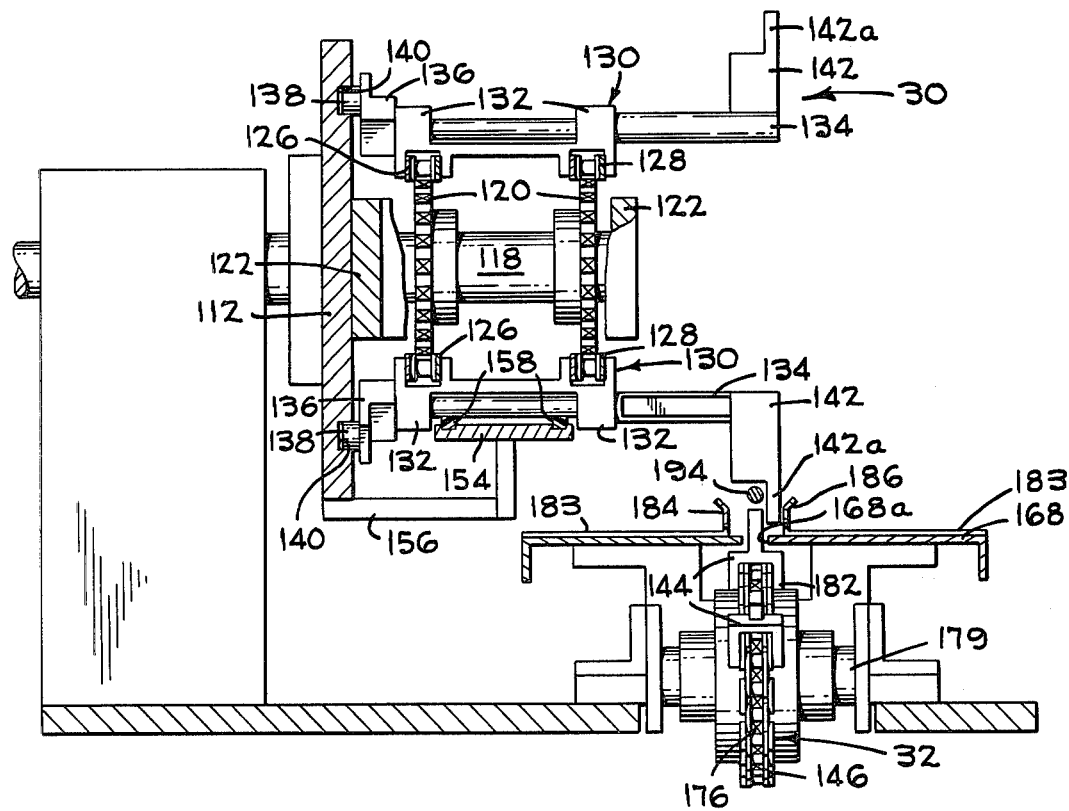
FIG_15

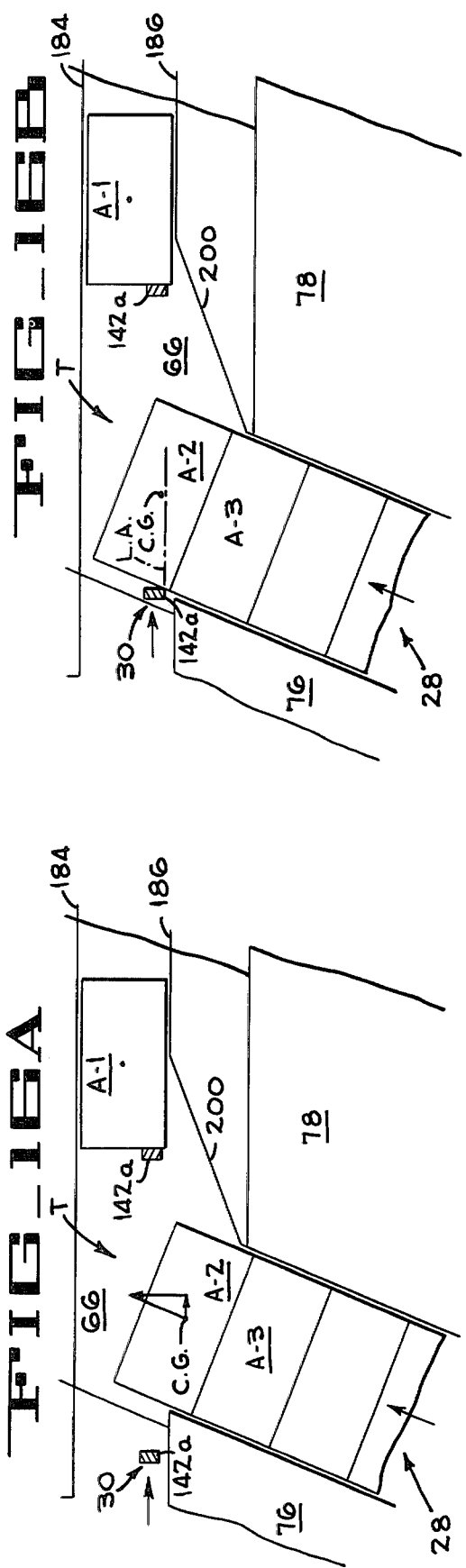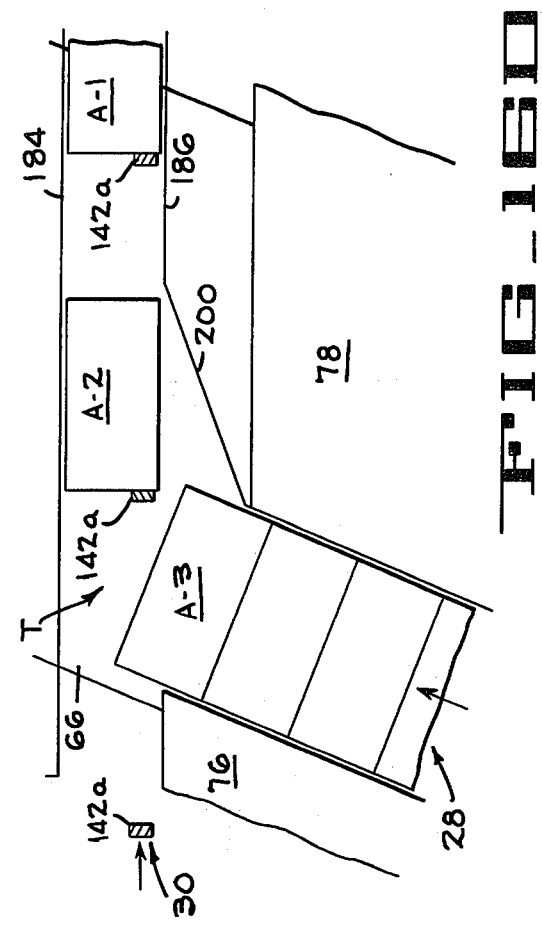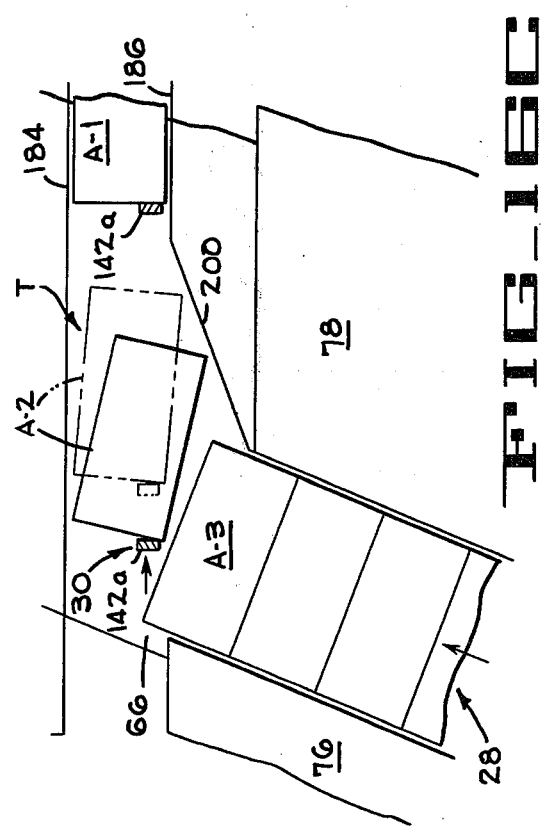

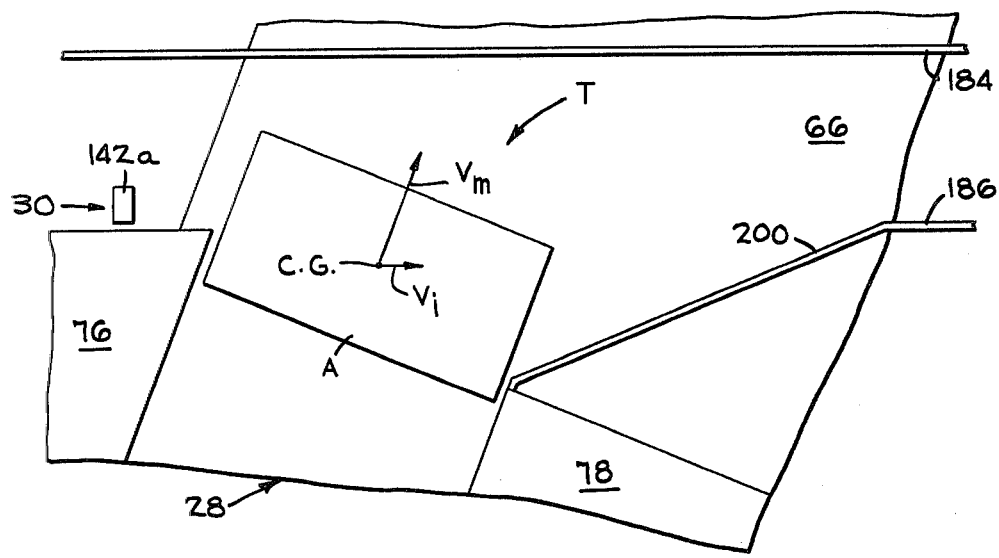
FIG_17A
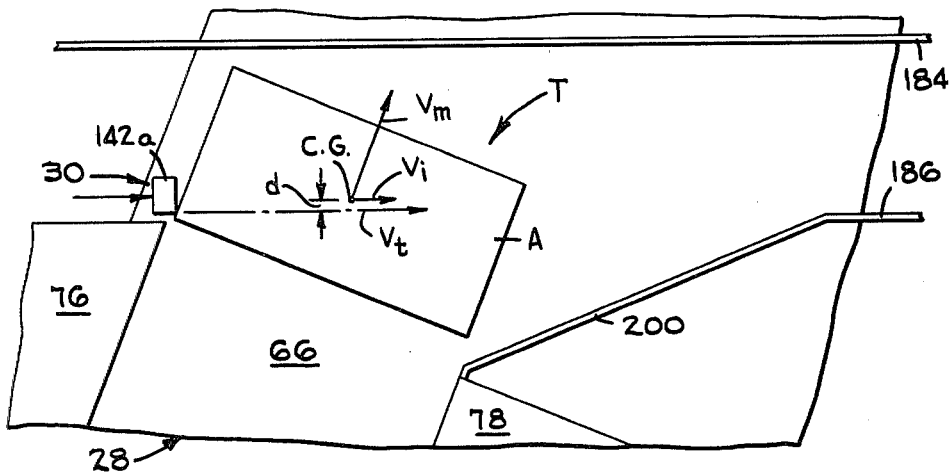
FIG_17B
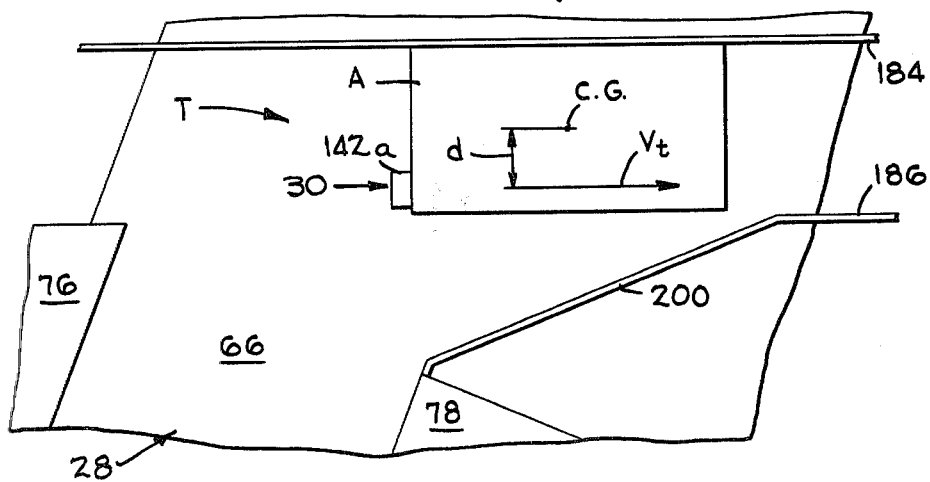
FIG_17C

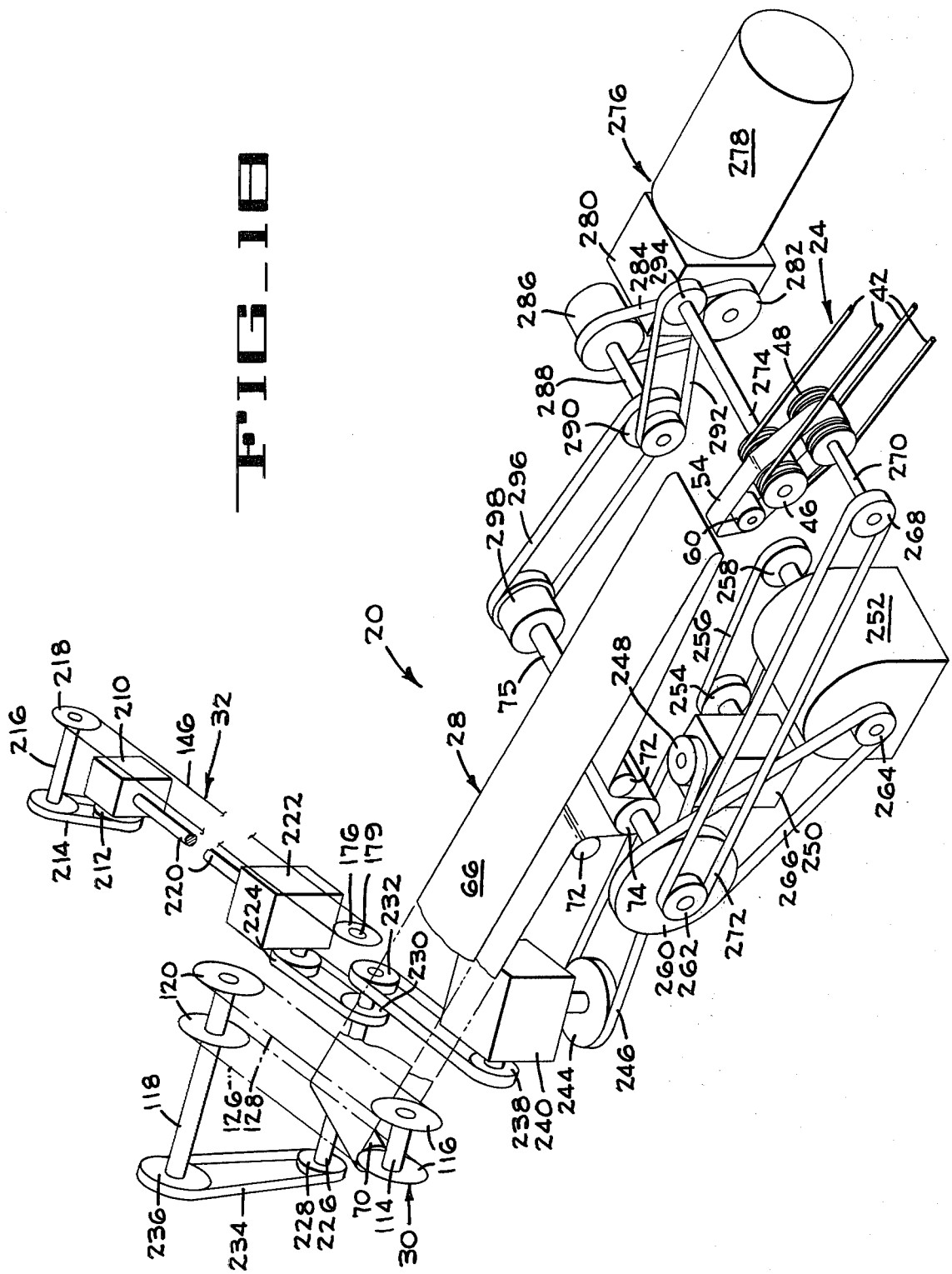

ARTICLE FEEDING MECHANISM

This is a continuation of application Ser. No. 955,671 filed Oct. 30, 1978, now abandoned.

PRIOR ART

U.S. Pat. No. 3,900,096 discloses a feeder for a horizontal form, fill and seal machine in which the articles are sequentially transferred from a supply conveyor to the wrapper infeed conveyor at high speed. Transfer is effected by a diagonally disposed overhead transfer conveyor having a series of equally spaced flights being formed to assure article orientation and controlled sequential feeding provided sufficient backlog pressure is maintained by the supply conveyor.

U.S. Pat. No. 3,721,330 describes a feeder also for use with a horizontal form, fill and seal machine. An incline conveyor supporting a single file of abutting articles feeds the articles between an overhead hold-down conveyor and a lower lifting conveyor to tilt each article to expose its trailing face. Another overhead conveyor engages the trailing face of the articles and feeds them to the infeed lug conveyor of the form, fill and seal machine.

U.S. application Ser. No. 865,061, filed Dec. 12, 1977, and assigned to the assignee of the present application, discloses a feeding apparatus in which a backlog of articles is created on an accumulating conveyor and fed to a flat belt metering conveyor. A photocell and a machine timed signal control the advance of successive single or groups of articles to the infeed conveyor of a horizontal form, fill and seal machine.

BACKGROUND OF THE INVENTION

The subject matter of the present disclosure relates to article feeding systems that accumulate in one or more rows of files and transfers each successive article or groups of articles along another path to the infeed of a processing machine and more particularly to a packaging machine of the type referred to as a horizontal, form, fill and seal machine. Due to the fragile nature of certain articles, especially candy bars, cookies and other food items, it is difficult to achieve the objectives of gentle and accurate handling at high speeds. For example, chocolate covered candy bars must be handled so that cracking, chipping or scraping of the coating is minimized or prevented.

The prior art includes many feeders arranged so that the file of articles are located at right angles to the infeed conveyor of the packaging machine. During transfer of the leading article from the file of articles, maintenance of sufficient backlog pressure is required to insure proper location of the leading article. As the leading article is conveyed toward the packaging machine sliding interaction occurs with the next succeeding article. In addition to imposing scraping between articles, the article backlog hesitates until the leading article has been displaced from the file. To avoid such scraping action right angle feeders have employed indexing drives synchronized with the transfer of the leading article, thus resulting in an intermittent hesitation of the file of articles or have incorporated mechanisms which will impart a reverse motion of the file of articles during the transfer of the leading article. Resort to such expedients overly complicate the feeder drives and oftentimes jamming and consequent damage to the articles occurs. These expedients further impose a serious limitation on the speed at which the backlog of articles can be processed.

Such basic requirements of gentle and accurate feeding at high speed renders most feeders incapable of being adapted or adaptable to meet these requirements, particularly when miniature and junior sized candy bars are to be fed at rates of 900 or more bars per minute.

Article size restrictions, in addition to the requirements of gentle and accurate feedings, impose a condition rendering adaptation of existing feeders difficult. Accordingly the feeding concept which will meet these requirements and be adaptable to a significant range of article sizes is an objective of the feeding mechanism of the present invention.

SUMMARY OF THE INVENTION

According to the present invention there is provided a feeding system, while disclosed in combination with a wrapping machine, is of general utility. It comprises means for accumulating articles to assume an abutting row and for urging the row of articles in a feed direction, and means for urging each article of the row upwardly so that the backlog or crowding pressure is minimized. In achieving this result the preferred construction combines the functions of a belt conveyor and an air conveyor. As disclosed, two laterally spaced round belts transport the articles. An air distributing manifold essentially comprising a flat plate, located between the belts and formed with a series of holes or orifices, discharges low pressure, high volume air to the under surface of the articles. As the articles enter the accumulating conveyor, hereinafter sometimes alternatively referred to as an air-belt conveyor, in spaced relationship their weight is substantially supported by the belts as the air discharged through the orifices does not encounter any significant resistance and thus no pressure drop is experienced. On coming into abutting contact with a previously conveyed article, and thus contribute in creating an abutting row of articles, the air imparts a levitating effect on substantially all the abutting articles. As a result, and since the belts are continuously operating, the crowding or backlog pressure is materially decreased. Achieving this condition reduces the driving force, and since the articles are always under the control of the belts, there is no skewing or wedging that would occur in known air conveyors.

Further, in accordance with the present invention the air-belt conveyor supplies its accumulated articles to a metering conveyor comprising conveyor means intersecting and extending beyond the article feed line of a wrapper infeed conveyor, such intersection defining an inclined angle of 90–130 degrees with the selected angle of this range being processed, and means, having articles transferring means in substantial alignment with the infeed conveyor of the wrapper and located over the metering conveyor, for transferring the leading article or articles from the metering conveyor to the infeed conveyor with such transfer occurring when the abutting surfaces of the leading article and the adjacent article are substantially spaced so that sliding contact therebetween is minimized or avoided, the row of articles on the metering conveyor advance to the transfer station at a constant velocity.

DESCRIPTION OF THE DRAWINGS

FIG. 1 is a perspective illustrating the novel feeder constructed in accordance with the principles of the present invention, associated with a horizontal form, fill and seal machine, FIG. 2 is a plan illustrating the intersection of the aligned accumulating and metering conveyors with the infeed conveyor, of the horizontal form, fill and seal machine, FIG. 3 is an elevation of FIG. 2, FIG. 4 is an enlarged fragmentary section taken substantially along the line 4—4 of FIG. 2, FIG. 5 is a section taken substantially along the line 5—5 of FIG. 4, FIG. 6 is an enlarged section taken substantially along the line 6—6 of FIG. 4, FIG. 7 is another section taken substantially along the line 7—7 of FIG. 4, FIGS. 8–11 are enlarged fragmentary sections illustrating the effect of air currents tending to raise the articles upwardly as they progress toward the metering conveyor and as they assume an abutting relationship on the air-belt conveyor, FIG. 12 is an enlarged section, taken substantially along the line 12—12 of FIG. 2, of the overhead cantilevered conveyor for transferring articles from the metering conveyor to the wrapper infeed conveyor, FIG. 13 is a horizontal section taken substantially along the line 13—13 of FIG. 12, FIG. 14 is a section taken substantially along the offset line 14—14 of FIG. 13, FIG. 15 is a section taken substantially along the line 15—15 of FIG. 13, FIGS. 16A–16B, 16C and 16D collectively illustrate transfer of an article from the metering conveyor to the wrapper infeed conveyor, FIGS. 17A, 17B and 17C, with reference to an article being transferred, illustrate vectors influencing the dynamics of the article, and FIG. 18 is a perspective of major components of the drive train.

DESCRIPTION OF THE PREFERRED EMBODIMENT

The article feeding mechanism constructed in accordance with the principles of the present invention is generally indicated by the numeral 20 in FIG. 1. The feeding mechanism is operatively associated with a horizontal form, fill and seal machine 22, sometimes hereinafter referred to as a wrapper or a horizontal wrapper whose construction and mode of operation is conventional and accordingly details thereof are not necessary for the understanding of the present invention. The components comprising the feeding mechanism 20 includes an article accumulating conveyor 24, which receives articles from a conventional belt conveyor 26, a metering conveyor 28 and a transfer conveyor 30. As will be described in greater detail hereinafter, the metering conveyor accumulates a single file of abutting articles which are transported at constant velocity toward the overhead transfer conveyor 30 that is aligned with the infeed conveyor 32 (FIGS. 12 and 13) of the wrapping machine 22. The infeed conveyor of the wrapping machine includes a series of regularly spaced article feeding lugs whose spacing is substantially equal to the length of the final package.

The accumulating conveyor 24 is provided with a plurality of conventional photoelectric devices 34 operating to control the speed of the wrapping machine 22 in response to the amount of articles which are sensed to be present on the accumulating conveyor 24. For example, if all three photoelectric devices detect the presence of an article or articles within their field of sensitivity the wrapping machines drive is conditioned to operate at maximum speed since a full inventory of articles are present.

The accumulating conveyor 24 is constructed to fulfill the requirement of reducing, to the absolute minimum, crowding forces or backlog pressure which results when a file of abutting articles is being moved toward a juncture where the successive articles are longitudinally spaced for further processing. To reduce the crowding forces, the accumulating conveyor 24 distributes, along its length, high volume, low velocity streams of air which are created by a blower 36 whose output is connected to a plenum 38 (FIGS. 4 and 5) by a duct 40.

FIGS. 2 and 3, illustrating the accumulating conveyor 24 and the metering conveyor 28 in plan and in elevation, respectively, show, in greater detail, the relationship between the two conveyors and the transfer conveyor 30 with the metering conveyor 28. The accumulating conveyor 24 comprises a pair of laterally spaced belts 42 having a circular cross-sectional shape (FIG. 6) and are spaced apart a distance sufficient to support the opposed ends of the articles A, advanced thereby. The belts 42 are trained around idler pulleys 44, which are vertically spaced and slightly longitudinally offset, located at the entrance of the accumulating conveyor 24. The belts are also trained and driven by a pulley 46 defining the discharge end of the conveyor 24 and the return reach of the belts engage a powered pulley 48 located downwardly and rearwardly of the pulley 46 so that clearance of the plenunum 38 is established. As shown in greater detail in FIGS. 4 and 6, the pulleys 46 and 48 are formed with circumferential semi-circular spaced grooves 50 in which the belts 42 are disposed. Each of these pulleys is provided with a central flat land portion 52 which constitutes a driving and supporting surface for a short flat belt 54 driven by pulley 48. The pulley 46 fulfills two functions; driving the round belts 42 and locating the upper reach of the belt 54 so that it defines a continuation of the article supporting surface of the accumulating conveyor 24. In order to avoid the use of a deadplate to bridge the gap between the conveyors 24 and 28, the belt 54 passes over a plate 56 formed with a short radius nose 58 so that the belt 54 can assist in creating a short gap between the conveyors 24 and 28. The belt, after passing over the plate 56, is directed over an idler pulley 60 to clear the pulley 46.

The metering conveyor 28 and the associated transfer conveyor 30 illustrated in FIGS. 2 and 3, receive articles from the accumulating conveyor and transfer them to the wrapping machine 22. The metering conveyor 28 is of a highly simplified construction and will be seen to include a frame structure 62 provided with a top flat plate 64, over which the upper reach of a flat wide belt 66 passes. The entry end of the metering conveyor 28 is shown in greater detail in FIG. 4 where it will be seen that the plate 64 is formed with a small radius bead 68 over which the belt 66 passes to thereby produce, in conjunction with the nose plate 58, a short gap between the belts 54 and 66, thereby permitting successive articles to pass from one conveyor to the other without hesitation or disorientation.

Referring now to FIG. 3 it will be seen that the belt 66 is trained over an idler pulley 70 and 72 located on either side of a downwardly disposed drive pulley 74 keyed to a shaft 75. As shown in FIG. 2, the belt 66 of the metering conveyor 28 extends beyond the line along which the transfer conveyor 30 feeds the successive articles to the infeed conveyor 32 of the wrapping machine 22. The metering conveyor is provided with an elongate, fixed guide fence 76 and a laterally adjustable guide fence 78 being adjustable to accommodate articles of different dimensions. These fences guide the articles towards the overhead transfer conveyor 30 operating to transfer the leading article to the infeed conveyor of the wrapping machine 22.

AIR BELT ACCUMULATOR

The accumulating conveyor 24 is designed in accordance with a concept whereby it can be used in any environment where an automatic feeder producing very low crowding or backlog pressure is necessary or desired. Prior art contructions comprising transversely spaced driven chains mounting freely rotating idler rolls, fixed idler rolls with tendency drives or belted chains with low frictional surfaces, while achieving the result of reducing backlog pressure, are not as desirable where conditions require handling of fragile and/or sticky bar or cookie food products.

With reference to FIGS. 3, 4 and 5, illustrating further details of the air belt conveyor, it will be observed that the plenum chamber 38 is in the form of an elongate rectangular box defined by upper and lower and side sheet metal panels 80,82 and 84, respectively. The plenum is secured to longitudinal support rails, 86 which are part of the frame structure 88 supporting the accumulating conveyor 24 and the metering conveyor 28. The upper sheet metal panel 80 is formed with a plurality of holes or orifices 90 through which air contained in the plenum 38 discharges. The pattern of orifices 90 extend for the entire length of the plenum chamber 38. Overlying the pattern of orifices and secured to the upper surface of the panel 80 is a generally rectangular elongate platform 92 also including a pattern of orifices 94 in alignment with the orifices 90.

The upper feeding reach of the round belts 42 are disposed adjacent and in contact with the longitudinal edges of the platform 92. The belts are retained in this position by a fixed and a laterally moveable plate 96 and 98, respectively, which overlie and are attached to the panel 80. These plates extend longitudinally at approximately the same length as the platform 92. The edges of the plates 96 and 98, which are adjacent the round belts 42, are beveled inwardly and downwardly and the height of the plates is that they are substantially above the geometric center of the belts 42, but their thickness is less than their diameter of these belts. By this geometry the tracking path of the belts 42 is maintained linear since the belts are captured, although freely, between the platform 92 and the inner beveled edges of the plates 96 and 98.

The articles A supported and advanced by the accumulating conveyor 24 rest, as shown in FIG. 5, on the belts 42 since the thickness of the platform 92 is approximately equal to the thickness of the plates 96 and 98. In this way a slight space or gap is produced between the upper surface of the platform 92 and the lower surface of the article being conveyed.

To insure the creation and maintenance of a longitudinal file of articles on the accumulating conveyor 24, flanking guide rods 100 and a central overhead guide rod 102 are provided. The rods are secured to threaded studs 104 being secured by fasteners to a bridge structure 106 comprising upright blocks 108 and a crosspiece 110.

In describing the mode of operation of the accumulating conveyor 24, it will be made evident that the air-belt concept produces a variety of results that fulfill many article handling requirements. Accordingly, this aspect of the disclosed subject matter, while shown in a packaging environment is of general applicability. With reference to FIGS. 8, 9, 10 and 11, which are intended to diagrammatically illustrate the mode of operation of the air belt accumulating conveyor 24, it will be observed that as a plurality of articles A are being advanced in the direction of the arrow R (FIG. 8) and before the successive articles are in abutting contact with the leading and trailing article, air supplied by the plenum chamber 38 is unrestrictedly discharged through the orifices 90 and 94. Those orifices which are within the projected area of the articles throttle the air flow and as a result tend to levitate the article as it is being advanced. However, in no instance, insofar as use in the disclosed environment is concerned, is the levitating effect sufficient to raise the article so that it slips or comes out of contact with the belts 42 before it comes into abutting contact with preceding articles. By adjusting the air volume to achieve this result, the article velocities will always match belt velocities which thereby prevents impact velocities of an order which would fracture candy bar coatings or crack cookies. Known air conveyors, while very efficient in transporting articles, do have the characteristic of high impact velocities as a backlog is being created, but the articles are usually of such a nature that they can withstand the impact encountered.

The levitating tendency of the air issuing through orifices 90 and 94 is at a minimum while the articles are longitudinally spaced as shown in FIG. 8 since the air from the plenum chamber 38 unrestrictedly passes through those orifices which are not within a projected area of an article. Under these circumstances, the articles are resting on the belts 42 and of course advanced thereby. FIG. 9 shows an article being advanced to assume an abutting relationship with a preceding article. FIG. 11 illustrates a series of articles A in abutting contact. When this condition exists substantial throttling of the air issuing from the orifices 90 and 94 occurs which increases the levitating effect, tending to slightly raise the articles above the surface of the belts 42. In cross section (FIG. 10) the levitating effect will be more clearly observed since the lower surface of the article is shown slightly spaced above the belts 42. Maintenance of a longitudinally aligned row of articles is insured by the guide rods 100. Although the illustrated levitating effect showing the article above the belt 42 has been exaggerated for purposes of this disclosure, it is to be realized that in actual use the articles will, in all probability, maintain contact with belts 42 but the contact pressure will be maintained at the minimum in order to retain the article under control of the belts and yet reduce the crowding or backlog pressure of the file of articles. It is to be realized, however, that whatever degree of levitation is desired can be controlled by the blower 36.

According to the above constructional arrangement of the airbelt conveyor several advantages arise. The velocity of conveyed articles match belt velocities as opposed to conventional air conveyors which produce high velocity and consequent high impact pressure as the articles assume abutting contact. Article alignment is maintained by virtue of belt control and there is no tendency to skew and wedge between side guides. By adjusting the air pressure to achieve any degree of levitation required or dictated by the article being handled, driving pressure can be minimized so that the levitating effect functions as a lubricant and thus article handling can be achieved with low driving pressure. By combining belts in combination with the air impelling system buckling and the tendency to shingle is minimized, and since the articles, although partially levitated, are always in contact with the belts 42, fluttering as produced in air conveyors is avoided. As the backlog of articles increases the driving force produced by the belts is decreased due to the increased levitating effect.

TRANSFER CONVEYOR

FIGS. 12, 13, 14 and 15 illustrate the constructional details of the overhead cantilevered transfer conveyor 30 that produces, in combination with the angled relationship between the metering conveyor 28 and the wrapper infeed conveyor 32, a variety of benefits which will hereinafter be specified. The dominating feature is that the abutted row of articles on the metering conveyor 28 is advanced to the transfer point at constant velocity. In achieving this result transfer of the leading article from the metering conveyor 28 to the infeed conveyor 32 occurs with very little or no sliding contact between the leading article and the next successive article and the impact produced by feeding lugs of the transfer conveyor is low enough to prevent chipping or cracking of chocolate coated candy bars or crumbling of fragile items such as cookies.

With reference to FIG. 12 it will be seen that the transfer conveyor 30 is mounted on a vertical plate 112 which provides a support for an idler shaft 114 mounting axially spaced idler sprockets 116 and a transversely spaced driving shaft 118 having keyed thereto driving sprockets 120. The shaft 118 has its outboard end supported by an offset bracket 122 secured to the plate 112 and mounting a bearing 124. Extending between the pairs of sprockets 116 and 120 and driven by the sprocket 120 are sprocket chains 126 and 128. As will be presently explained, the sprocket chains have pinned thereto, at regularly spaced intervals, lug mounting carriers 130. The carriers are formed with ears 132 having aligned bores for rotatably receiving a shaft 134. On the end of the shaft 134 adjacent the vertical plate 112 each shaft has fixed thereon a block 136 rotatably mounting a cam follower roller 138 disposed in a cam track 140 formed in the vertical plate 112. The opposite ends of the shaft 134 extend beyond the carrier 130 to a point where they overlie the wrapper infeed conveyor 32. On the end of each shaft 134, a transversely extending feed dog or lug, formed to define a finger 142a, is secured. The finger serves to prevent interference with lugs 144 which are secured to the infeed chain 146 of the infeed conveyor 32. The relationship of the lug 144 and the finger 142a is clearly illustrated in FIG. 15.

To stabilize the chains 126 and 128 as they traverse the linear reaches between the sprockets 116 and 120, upper and lower sets of strips 148 and 150, respectively, are secured to the bracket 122 and a plate 152 carried by the vertical plate 112. To further stabilize the chains 116 and 120 as they traverse the lower reach, a platform 154, attached to the vertical plate 112 by a fabricated bracket 156, is provided. In grooves formed in the platform 154 wear strips 158, which may be made of Teflon or Nylon, are disposed. The wear strips are frictionally engaged by that portion of the shaft 134 between the ears 132. By providing the stabilizing strips 148 and 150 and the platform 154 carrying the wear strips 158 in slidable engagement with the shaft 134, the lower run or reach of the chains 126 and 128 are maintained very stable and any tendency to sag is restrained.

During operation of the transfer conveyor 30 the attitude of the lug 142 is controlled by the cam track 140 within which the cam follower rollers 138 are disposed. When the carriers 130 traverse the linear uppper or lower reaches they assume an attitude which is substantially perpendicular to the direction of movement whereas as they enter and traverse the end semi-circular portions of the cam track 140, the lugs 142 commence assuming a vertical orientation (FIG. 12) before and after the lower linear feeding reach is encountered. By maintaining vertical orientation of the lugs 142 as they are elevated around the sprockets 120, any tendency to tilt or lift the rearward end of the article being fed is minimized and any tendency to scrape or scratch the articles is avoided. As will be explained presently, further means are provided to ensure stabilization of each article as it is transferred and picked up by the wrapper infeed conveyor 32.

With reference to FIG. 12, illustrating the intersection of the wrapper infeed conveyor 32 and the metering conveyor 28 along the line 12—12 of FIG. 2, which is substantially parallel to the feed line of the infeed conveyor 32, it will be observed that the metering conveyor 28 comprises a box-like support structure made of longitudinal rails 160 and an interconnecting base plate 162 formed with a circular opening receiving a disc 164 secured to and projecting upwardly from a lower circular pad 166. The top plate 64 supporting the metering belt 66 is secured to the upper surfaces of the longitudinal rails 160 but it overlies a plate 168 formed with a slot 168a. The rail 160 adjacent the infeed conveyor 32 is formed with an undercut portion 169 allowing plate 64 to overlap the plate 168.

The disc 164 is rotatably disposed in the circular opening formed in plate 162 to allow rotation of the metering and accumulating conveyors 28 and 24, respectively, about the axis of disc 164. In this way the angle of intersection with the infeed conveyor can be adjusted to suit article size and geometry.

As shown in FIG. 12 the sprocket chain 146 of the infeed conveyor 32 passes over a sprocket 176 keyed to an idler shaft 179. As is also usual in the art, the feeding reach of the sprocket chain 146 is provided with a rail 180 which is slidably engaged by the base leg 182 of the lugs 144. In this way, each lug 144 is rigidly maintained in an erected position while articles are being fed to downstream stations of the packaging machines. To properly guide the articles toward the infeed conveyor 32, laterally adjustable plates 183 formed with upwardly extending flared rails 184 and 186 are suitably secured to the underlying plate 168.

The plates 183 formed with the guides 184 and 186 are mounted on the plate 168 so that they are laterally adjustable to accommodate articles of different sizes, but in all events each guide is positioned so that the lugs of the infeed conveyor 32 are centered therebetween. The guides 184 and 186 extend over the metering belt 66 while the plate 168 underlies the plate 64. Thus the guides 184 and 186 provide an entrance chute for the articles as they are transferred from the metering conveyor 28 to the infeed conveyor 32. The extension of the side guides 184 and 186 is clearly illustrated in FIG. 13.

To assist in preventing any disorientation of each article as it is transferred from a metering conveyor 28 to the infeed conveyor 32 hold-down rod 187 mounted at frequent intervals to a stud 190 which is connected to an L-shaped bracket 192. The hold-down rod overlies the juncture of the accumulating conveyor 24 and the metering conveyor 28 and terminates adjacent the transfer point T. Another hold-down rod 194, secured to a bracket 196 overlies the conveyor 32. The hold-down rod 194 terminates at a point after an article has been engaged by a feed lug 144 which is traversing the upper reach of sprocket chain 146. It should be noted that the hold-down rod 194 is located centrally above the feed lugs 144 and that the finger travels in a path between the side guide 186 and the lug 144.

The laterally adjustable article guiding fence 78 (FIG. 7) terminates at 198 (FIG. 13) and is connected by a bridge 200 to the side guide 186. As will be explained hereinafter, the bridge 200 fulfills the function of insuring that each successive article, fed from the backlog on the metering conveyor 28 to the infeed conveyor 32, is located between the guides 184 and 186.

In operation, on creation of a backlog of articles on the metering conveyor 28, the articles are continually urged by the conveyor 66 toward the transfer station T. Ideally, these abutted articles would move at the same constant velocity as the metering conveyor. However, in order to avoid accumulative metering error, the metering drive is adjusted to slightly overfeed the articles so that the leading corners of each successive article will always contact the side guide 184 an instant before the article endface is engaged by the fingers 142a. Consequently, there is a very slight slippage between the metering belt and the abutted articles conveyed thereby, and as a result, the infeed of abutted articles will be essentially constant velocity but will have very short periods of arrested motion.

As one of the fingers 142a engage the article endface, it is translated in a counterclockwise direction, as viewed in FIG. 13, until its longitudinal edge comes into contact with guide 184. FIGS. 16A, 16B, 16C and 16D diagrammatically illustrate the sequence and dynamics in transferring an article from the file of articles on the metering conveyor 28 to a position between guides 184 and 186. FIG. 16A illustrates a condition whereby an article A-1 is being conveyed toward the infeed conveyor 32 and its advance is under control of one of the fingers 142a. The succeeding article A-2 forming the leading articles of the backlog of articles, is advanced along a linear path toward the guide 184 by the belt 66. An oncoming finger 142a will engage an upstream portion of a rearwardly facing edge or endface of the article A-2 as it clears the fixed fence 76. The center of gravity of each article A-1, A-2 and A-3 is indicated by the dot labeled C.G. FIG. 16B depicts the moment at which one of the fingers 142a engages the exposed end of the article A-2 and it should be noted that the point of contact of the finger 142a defines a line of action L.A. located a small distance from the article's center of gravity with the center of gravity located between the line of action L.A. and the guide 184. Such a geometric relationship imparts a turning moment to the article A-2 which increases and reaches a maximum when the longitudinal edge of the article is located against the outer guide 184. During the transition from the metering conveyor 28, the articles are continually under the influence of the belt 66 moving the article toward the guide 184. This influence, in combination with the turning moment provided by the feeder finger 142a contributes in transferring each article from the file of articles to assume the longitudinal spacing required by the pitch of the lugs 144.

With reference to FIG. 16C, rotation and concurrent linear movement of the article A-2 once it has been engaged by the finger 142a, is shown in full and phantom outline. It should be noted that the bridge 200, while certainly operative to deflect articles coming in contact therewith toward the infeed conveyor 32, is not, under ideal conditions of article geometry and surface texture, engaged by the article during its transition from the metering conveyor 28 to the infeed conveyor 32.

FIG. 16D shows the article A-2 properly oriented for reception by the infeed conveyor 32 while the succeeding article A-3 is being moved in the direction of the arrow to assume the position of article A-2 shown in FIG. 16B.

Whether the center of gravity of the article is located such that a counterclockwise turning moment (as seen in FIG. 16B) is imparted on initial contact with the article by the feeding finger 142a is not essential to the proper operation of the disclosed feeder but it does assist in more rapidly orienting the article so that its longitudinal edges are parallel to the guides 184 and 186. The location of the center of gravity to be inside, congruent or outside the line of action of the feedng finger 142a depends upon the geometry of the article being fed and the angle of intersection defined by the metering conveyor 28 and the infeed conveyor 32. Accordingly, it should be appreciated that the condition of having the article's center of gravity between the guide 184 and the line of action of the finger 142a is preferable to the extent that contact of an article with the wall 200 is avoided or minimized.

FIGS. 17A, 17B and 17C diagrammatically illustrate the dynamics imparted to a selected article by the combined action of the metering conveyor 28 and the feeding finger 142a. Article movement is represented by the vector $V_m$ which is produced by the belt 66 while the velocity component in the direction of the infeed conveyor 32 is represented by the ventor $V_i$. When the finger 142a commences movement of the article (FIG. 17B) the velocity imparted thereto is represented by the vector $V_t$ defining a moment arm relative to the center of gravity C.G. substantially equal to a distance d. On this occurrence, rotation in a counterclockwise direction commences and the instantaneous velocity in the direction of the infeed conveyor 32 is the sum of vectors $V_t$ and $V_i$. Rotation about the center of gravity increases the moment arm d until its length achieves a maximum when the longitudinal edge of the article comes to rest against the guide 184. This condition is shown in FIG. 17C. It should be appreciated that the finger 142a, due to its asymmetrical line of action maintains the article against the guide 184 until the article is engaged by one of the lugs 144 on the infeed conveyor 32.

When the combined effect of the angle of intersection between the metering conveyor 28 and the infeed conveyor 32 locates the center of gravity of the articles outside the line of action of the feeding fingers 142a, the turning moment aligning the article with the infeed conveyor 132 is derived from the combined effects of the conveyor 66 and the feeding finger 142a. The result of the forces created is such that even with the center of gravity outside the line of action of the finger 142a, the frictional force between the belt 66 and the lower surface of the article is sufficient, in combination with the finger 142a, to effect rotation and alignment of the article against the guide 184. In this instance the frequency with which the article encounters the bridge 200 may increase.

According to the above description, it should be appreciated that the disclosed feeder, by providing overhead flighted chains makes for a very versatile feeder as it is merely necessary to change the pitch of the infeed conveyor lugs and the fingers of overhead transfer conveyor 32 to accommodate articles within a significant range of article sizes. High speed feeding, which is one of the major attributes of the present invention is achieved since the articles in abutting relationship on the metering conveyor are fed to the transfer conveyor at constant velocity. In contrast, most prior art feeders are designed to require or impose an indexing motion or a hesitation as a result of the "peeling" of the leading article from the abutting row of articles. Hesitation under these circumstances results because the leading article must be completely displaced from the line of abutting articles before the next article is fed. As is evident, the concept of the present invention, by providing an overhead cantilevered transfer conveyor and an oblique metering conveyor, allows the file of articles to advance without any hesitation, thereby the file of articles can be advanced at a constant velocity. By virtue of this arrangement, slidable movement between the leading article and the adjacent rearward article is minimized and under certain circumstances, completely prevented due to the skewing motion of the lead article of the single file of articles. The effects of the metering belt 66 and the angle of approach of the feeding finger 142a concurrently contributes to achieve this result. Further, in accordance with the present invention, feeding of in-line multiples (more than one article concurrently) is greatly facilitated by virtue of the overhead contilevered transfer conveyor 30. Its construction and accessability facilitates changing of the pitch of the flights and their conformation to suit a variety of article shapes and, of course, feeding more than one article concurrently. By providing a transfer conveyor such as the conveyor 30, it is now a very easy matter to change the angle of intersection between the metering conveyor and the wrapper infeed conveyor in response to product sizes and shapes. Deadplates or slots of any configuration in transferring the product from the backlog conveyor to the wrapper infeed conveyor is no longer required as the concept of the present invention, in utilizing an overhead cantilevered transfer conveyor, transfers the product directly from the metering conveyer belt to the wrapper infeed conveyor. Moreover, the spacing of the transfer conveyor fingers, which can be dimensioned to suit the product being processed, can be easily changed. The ability to provide wide plate-like lugs on the transfer conveyor and narrow lugs on the article infeed conveyor optimize product transfer and overwrapping of the product by the wrapping machine. In supporting a product on a flat metering belt, such as belt 66, articles having a rough textured bottom (nuts or other particulate material), consistent pickup by the flights of the transfer conveyor is rapid and reliable. A particularly significant advantage is achieved by the constructional arrangement whereby the metering belt 66 extends beyond the wrapper infeed conveyor and the overhead cantilevered transfer conveyor (FIG. 13) since small diameter pulleys or nose plates (such as plates 56) are not required. The product is merely pushed off the metering belt 66 into the wrapper infeed conveyor. Accordingly, a large diameter pulley, such as pulley 70, can be incorporated in the design. Finally, a significant result achieved by the concept of the present feeder is that article separation occurs naturally during transfer and this is achieved with very little, if any, sliding contact between the article being transferred and the succeeding article.

FIG. 18, which is a diagrammatic perspective of a preferred form of the drive train synchronizing operation of the accumulating and metering conveyors 24 and 28 respectively, comprises a main gear box 210 driven by the drive of the wrapping machine (not shown) having an output mounting a pulley 212, driving through a belt 214, a shaft 216 having keyed thereon a sprocket 218 that drives the chain 146 of the infeed conveyor 32. An output shaft 220 from the gear box 210 drives another gear box 222 having its output drivingly connected, by means of a belt 224, to a shaft 226 on which is keyed axially spaced pulleys or sprockets 228,230 and 232. The belt 224 drives pulley 230. The transfer conveyor 30 is driven by a belt 234 extending between the pulley 228 and a pulley 236 keyed to the shaft 118.

The pulley 232 is drivingly connected to a pulley 238, keyed to an input shaft of another gear box 240, by a belt 242. The gear box 240 is located concentric with the disc 164 in order to allow adjustment of the angle of intersection between the metering conveyor 28 and the infeed conveyor 32 and yet maintain the driving relationship of the drive elements. A pulley 244 is keyed to the output shaft of the gear box 240 and drives, by means of a belt 246, a pulley 248 defining the input to another gear box 250. A variator 252 is driven by the gear box 250, by means of a pulley 254 on the output shaft of the gear box 250. A belt 256 drives a pulley 258 secured to the input shaft of the variator 252. On the shaft 75, mounting the metering belt drive pulley 74, a large diameter and small diameter pulley 260 and 262 respectively, are keyed. The large diameter pulley is connected to the output pulley 264 of the variator by a belt 266 while the small diameter pulley 262 is connected to a pulley 268, secured to a shaft 270, by a belt 272. The shaft 270 carries the pulley 48 which drives the bridging or short flat belt 54.

The pulley 46 driving the belts 42 of the accumulating conveyor 24 is secured to a shaft 274 which is driven by an eddy current drive generally designated as 276. The drive comprises a DC motor 278 connected to a clutch 280 having a pulley 282 mounted on its output shaft. Through a belt 284, the pulley 282 drives a one-way clutch 286 mounted on a shaft 288 which has keyed thereon a stepped pulley 290. A belt 292 from the step pulley 290 to a pulley 294 keyed to a shaft 274 effects driving of the shaft 274 and accordingly, the pulley 46 keyed thereon. From the step pulley 290 another belt 296 drives another one-way clutch 298 keyed to the shaft 75, which will be recalled, also mounts the pulley 74 which drives the belt 66 of the metering conveyor 28.

The photoelectric devices 34 overlying the accumulating conveyor 24 detect the presence and the amount of articles on the accumulating conveyor 24. The photoelectric devices are integrated with the drive of the wrapping machine 22 in a sense that when a threshold amount of articles are detected, the wrapping machine is operated at maximum speed whereas a lesser number of articles will reduce the speed of the wrapping machine consistent with the detected inventory. In those instances where the devices 34 detect an inventory of articles below the threshold amount, the speed of the wrapping machine is accordingly reduced in order to adjust the speed of wrapping to the number of articles accumulated. When the accumulating conveyor 24 and the metering conveyor 28 are being driven solely by the wrapping machine 22, torque is transmitted to the shaft 274 through the one-way clutch 298 whereas the one-way clutch 286 is rotating in a direction which effects slip. Assuming the wrapping machine slows down in response to the signal of the photoelectric devices 34, the eddy current drive transmits power to the shaft 274 through the one-way clutch 286 driving the belts 42 of the accumulating conveyor at sufficient speed to again establish a backlog of articles, which, on being detected, by the devices 34 signal the wrapping machine to increase and reach maximum speed. Under these conditions, the accumulating conveyor 24 is then driven through the one-way clutch 298 and the belts 296 and 292.

The backlog control system, including the photoelectric devices 34 are common in the art and detailed description thereof is not necessary.

Although the best mode contemplated for carrying out the present invention has been herein shown and described, it will be apparent that modification and variation may be made without departing from what is regarded to be the subject matter of the invention.

We claim:

1. In an apparatus for feeding articles to a wrapping machine, said apparatus having an infeed conveyor mounting regularly spaced article feeding lugs, a supply conveyor for continually advancing an aligned longitudinal abutting row of articles along a linear path, laterally spaced guide means overlying the supply conveyor to retain the articles in a longitudinal row, and a transfer conveyor for directing successive leading articles from the abutting row of articles to the infeed conveyor, connecting said supply conveyor to said infeed conveyor so that the line of advance of the abutting articles defines an angle of intersection greater than ninety degrees with the feed path of said infeed conveyor, article feeding fingers on said transfer conveyor orbiting in a vertical plane which is substantially coplanar with the vertical plane containing the path of said infeed conveyor, said abutting row of articles being advanced at substantially the same speed as the speed of said supply conveyor toward the feed path of said infeed conveyor, said articles in said row of abutting articles being successively transferred to said infeed conveyor when a finger of said transfer conveyor engages an upstream portion of a rearwardly facing edge of the article of said abutting row of articles facing said finger as it passes beyond the guide means and, in combination with the concurrent movement of the article by the supply conveyor, a turning moment is produced disassociating the article from the abutting row of articles and propelling the article toward the infeed conveyor.

2. The feeding apparatus according to claim 1 further comprising an elongate guide rail parallel to and adjacent the lugs of said infeed conveyor, said guide rail extending across and beyond the path of abutting articles to intercept the freely moving articles and direct them to the infeed conveyor.

3. The feeding apparatus of claim 1 wherein the turning moment imparted to the article being transferred from the supply conveyor to the infeed conveyor is, in part, produced when said fingers make contact with said rearwardly facing edge of the article exposed to said fingers.

4. An apparatus for feeding an abutting row of articles comprising a belt conveyor for supporting and advancing the articles, an infeed conveyor having a plurality of regularly spaced lugs receiving and introducing articles to a wrapping machine, said belt and lug conveyors intersecting at an angle greater than ninety degrees, a transfer conveyor having a plurality of vertically extending article engaging fingers having their ends closely adjacent the upper surface of said belt conveyor supporting the abutting row of articles and traveling along the feeding path of said infeed lug conveyor, guide means overlying said belt conveyor for confining the abutting articles to maintain alignment, said guide means terminating adjacent the path described by said fingers, and means laterally spaced from the feed path of said infeed conveyor and extending across the feed path of the abutting articles for intercepting and directing successive articles to said infeed conveyor, as each successive articles of said abutting row of articles passes said guide means it is completely unconfined and an upstream portion of a rearwardly facing edge of the article is engaged by said one finger and propelled forwardly to said intercepting and directing means in a trajectory resulting from the motion of said belt conveyor and said one finger.

5. The feeding apparatus according to claim 4 wherein the article engaging fingers of said transfer conveyor engage said edge of the leading unconfined article at a point where its center of gravity is between the point of finger engagement and the directing means to thereby effect a turning moment as said fingers travel in the path of said infeed conveyor.

6. The apparatus according to claim 4 wherein said transfer conveyor comprises laterally spaced sprocket chains, carriers secured at regularly spaced intervals to said chains, and a shaft rotatably mounted in said carriers, one end of said shaft extending a substantial distance beyond said carriers with said fingers being secured to the end of said shafts.

7. The apparatus according to claim 4 wherein the other end of said shaft is connected to a cam operated link for controlling the orientation of said fingers as they engage and disengage the article being transferred.

8. A feeder for supplying articles to a horizontal form, fill and seal wrapping machine including an infeed conveyor for receiving and moving the articles along a first path, said feeder comprising means for receiving and arranging spaced articles to assume an abutting linear row, means defining an extension of said receiving and arranging means for receiving and continually advancing the linear row of abutting articles in a second path intersecting said first path, said paths defining an angle of intersection greater than ninety degrees, means at the intersection of said paths for successively transferring articles from said second path to said first path, laterally spaced guide rails confining the articles to maintain alignment, said article transferring means comprising orbiting article engaging finger means moveable in a path closely adjacent the end of said guide rails for disassociating and transferring each successive leading article from the abutting row of articles against a raised straight track directing the articles along said first path to said infeed conveyor by engagement of said finger means with an upstream portion of a rearwardly facing edge of each article, and transfer of articles toward said track occurs without constraining article orientation.

9. An apparatus for feeding articles to a wrapping machine including an infeed conveyor moving in a rectilinear path and having a plurality of regularly spaced lugs for advancing the articles in longitudinally spaced relationship, said apparatus comprising a conveyor for receiving, continuously advancing and grouping the articles being supplied in a randomly longitudinally spaced array, to assume at least one longitudinal abutting row of articles, laterally spaced guide rails on said receiving conveyor serving to retain the articles in such a row, an overhead transfer conveyor having feeding fingers whose lower extremity is closely adjacent the surface of said receiving and advancing conveyor and moving in a linear path closely adjacent to and parallel to the path of said infeed conveyor, an angle of intersection greater than ninety degrees is defined by the path of said fingers and the path of the abutting articles, on passing said guide rails an upstream portion of an edge of the article facing upstream toward the finger moving toward it is contacted thereby and propelled along a path parallel to the path of said infeed conveyor effecting immediate physical separation of the propelled article from the row of abutting articles, said article being propelled is concurrently moved in the path of said infeed conveyor by the movement of said receiving conveyor.

10. The feeding apparatus according to claim 9 wherein said articles are directed to said infeed conveyor by providing a guide rail confronting the intersection and extending to the region where the articles are engaged by the fingers of said infeed conveyor.

11. The feeding apparatus according to claim 9 further comprising means for pivotally connecting said receiving conveyor to said infeed conveyor to define selected angles of intersection therebetween.

12. An apparatus for supplying articles to a wrapping machine having an infeed conveyor operative to effect equal longitudinal spacing and feeding of the articles along a retilinear path, said apparatus comprising means for continuously advancing and supporting a row of abutting articles along a retilinear path intersecting the first mentioned path at an angle greater than 90 degrees, said advancing means traversing said first mentioned path, means for directing each succeeding leading article of said abutting row of articles, as it progresses toward the intersection of said paths to said infeed conveyor so that substantially no hesitation or retardation of said row of abutting articles occurs, said directing means including a finger engageable with an upstream portion of a rearwardly facing edge of a said article, and said directing means, in combination with said means for continuously advancing and supporting a row of abutting articles cooperating to effect unconfined transfer of the leading article along a trajectory toward the path of said infeed conveyor to obviate scraping action with the adjacent trailing article.

13. An article feeding system of the type comprising an article supply conveyor that intersects a packaging conveyor and includes an overhead transfer conveyor at the intersection, the transfer conveyor having a transfer reach with depending article transfer flights; the improvement wherein said transfer reach of the overhead conveyor runs along a path parallel to that of said packaging conveyor, the path of said supply conveyor intersecting that of said packaging conveyor at an obtuse angle as measured from a point on the supply conveyor path that is downstream of the intersection, means for driving said supply conveyor at one velocity, means for driving said transfer conveyor at a velocity sufficiently higher than that of said supply conveyor to cause that velocity component of transfer conveyor flight motion which extends along the path of supply conveyor motion to exceed the velocity of the supply conveyor so that said transfer conveyor will separate a leading article on the supply conveyor from those behind it, said transfer conveyor flights being formed for engaging solely an upstream portion of the trailing sides of articles being transferred, said flights leaving the leading sides of the articles unconfined during transfer.

14. The article feeding system of claim 13 wherein said supply conveyor has an upstream guide rail on the side thereof that is first approached by said transfer conveyor flights and which terminates above said packaging conveyor, said transfer conveyor flights having a path that runs close to the termination of said supply conveyor upstream guide rail for engaging articles on the supply conveyor side of the centroid of an article being transferred.

* * * * *